(12) United States Patent
Codilian et al.

(10) Patent No.: US 6,751,041 B1
(45) Date of Patent: Jun. 15, 2004

(54) METHOD AND APPARATUS FOR SELECTING SERVO TRACK WRITING SPEED

(75) Inventors: Raffi Codilian, Irvine, CA (US); Joseph M. Viglione, Laguna Hills, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 374 days.

(21) Appl. No.: 10/066,192

(22) Filed: Jan. 31, 2002

(51) Int. Cl.[7] ............................................. G11B 15/46
(52) U.S. Cl. ................................................... 360/73.03
(58) Field of Search ............................. 360/73.03, 51, 360/75, 77.04, 77.02

(56) References Cited

U.S. PATENT DOCUMENTS 6,587,293 B1 * 7/2003 Ding et al. .................... 360/51
2002/0191325 A1 * 12/2002 Smith et al. ................... 360/75

* cited by examiner

*Primary Examiner*—David Hudspeth
*Assistant Examiner*—Mitchell Slavitt
(74) *Attorney, Agent, or Firm*—Milad G. Shara, Esq.; Knobbe Martens Olson & Bear

(57) ABSTRACT

A method and an apparatus select the spindle rotation speed for writing servo tracks to a disk based on measured performance of the head-disk assembly. The position error values are measured and analyzed to generate a position error metric. Based on the value of the position error metric, a spindle rotation speed is selected for use when writing servo tracks to a disk.

13 Claims, 5 Drawing Sheets

METHOD AND APPARATUS FOR SELECTING SERVO TRACK WRITING SPEED

BACKGROUND OF THE INVENTION

1. Field of the Invention

The present invention relates to a method for improving the manufacture of disk drives. More specifically, the invention involves the determination of a spindle rotation speed for writing servo tracks to a disk drive based on measured servo performance of a head-disk assembly.

2. Description of the Related Art

Disk drives are principal components in the vast majority of computer systems. The drives store information in a non-volatile manner and can be readily written, read, and re-written. Large amounts of information can be stored on disk drives reliably at low cost.

A typical disk drive consists of one or more rigid disks or "platters" that are attached to a spindle. The spindle is attached to a spindle motor which rotates the spindle and the attached platter or platters. The surfaces of the platters comprise a magnetic medium. As the platters rotate, magnetic heads write magnetic transitions to or read magnetic transitions from the medium.

The magnetic storage portion of the disk platters is organized into substantially concentric circular regions. Each circular region is divided into arcuate sectors formed by regular angular wedge-like demarcations around the disk. The magnetic read and write heads are attached to an actuator that moves the head to read or write a particular sector of the platter or platters. Positioning of the read or write head is achieved via the use of servo tracks that are written to the disk. The servo tracks are written at intervals around the disk and on each side of a region of the disk that is to contain data. The position of the head on the disk is determined by reading the servo tracks, and consequently, the servo tracks must be accurately placed on the drive medium.

For the disk to be used, servo tracks must be placed on the disk. The tracks can be etched or printed onto the disk medium, written by a servo track writer, or self-written by the disk drive. Additionally, the servo tracks can be written by a combination of these servo track writing techniques.

The placement of servo tracks onto the disk of a disk drive is an important part, but a potentially time consuming part, of the manufacture of disk drives. Although etching or printing of the servo tracks onto the disks can produce a high volume of disks containing servo tracks very quickly, these methods can not produce the density of servo tracks on a disk that is needed for modem high capacity hard drives. Dedicated servo track writers can produce the density of servo tracks needed for modem drives, but the specialty manufacturing equipment is expensive, and the number of servo track writers used during the manufacturing process is typically limited. Self-writing of all or a portion of servo tracks by the disk drive itself does not require special manufacturing equipment, but is the slowest way to place the servo tracks onto a disk.

SUMMARY OF THE INVENTION

A first aspect of the present invention is a method for determining a spindle rotation speed to be used for writing servo tracks on a head-disk assembly which will be incorporated into a fully assembled disk drive. The head-disk assembly comprises a recording head, a rotary actuator, a spindle motor, and a storage medium. The storage medium is coupled to the spindle motor and has an inner circumference and outer circumference with a magnetic storage portion between the inner and outer circumference.

The position error values of at least one servo track are measured. A position error metric is generated by analyzing the position error values. A spindle speed for writing servo tracks is selected based upon the value of the position error metric.

Another aspect of the present invention is a servo track writer that writes calibration tracks on the storage medium of a head-disk assembly, and that determines the operational disk spindle rotation rate. The servo track writer comprises a controller, a servo performance measurement circuit, and a servo track writer speed selector. The controller processes a clock reference pattern to determine the location of the write element and directs the head to write the servo tracks on the storage medium. The servo performance measurement circuit measures position error values of the servo tracks written on the head-disk assembly and generates a position error metric value. The servo track writer speed selector calculates a desired servo track writer speed from the value of the position error metric generated by the servo performance measurement circuit.

BRIEF DESCRIPTION OF THE DRAWINGS

The accompanying drawings are included to provide a further understanding of the present invention and are incorporated in and constitute a part of this specification. The drawings illustrate embodiments of the present invention and, together with the description, serve to explain the principles of the invention.

DETAILED DESCRIPTION OF THE PREFERRED EMBODIMENT

Figure 1:
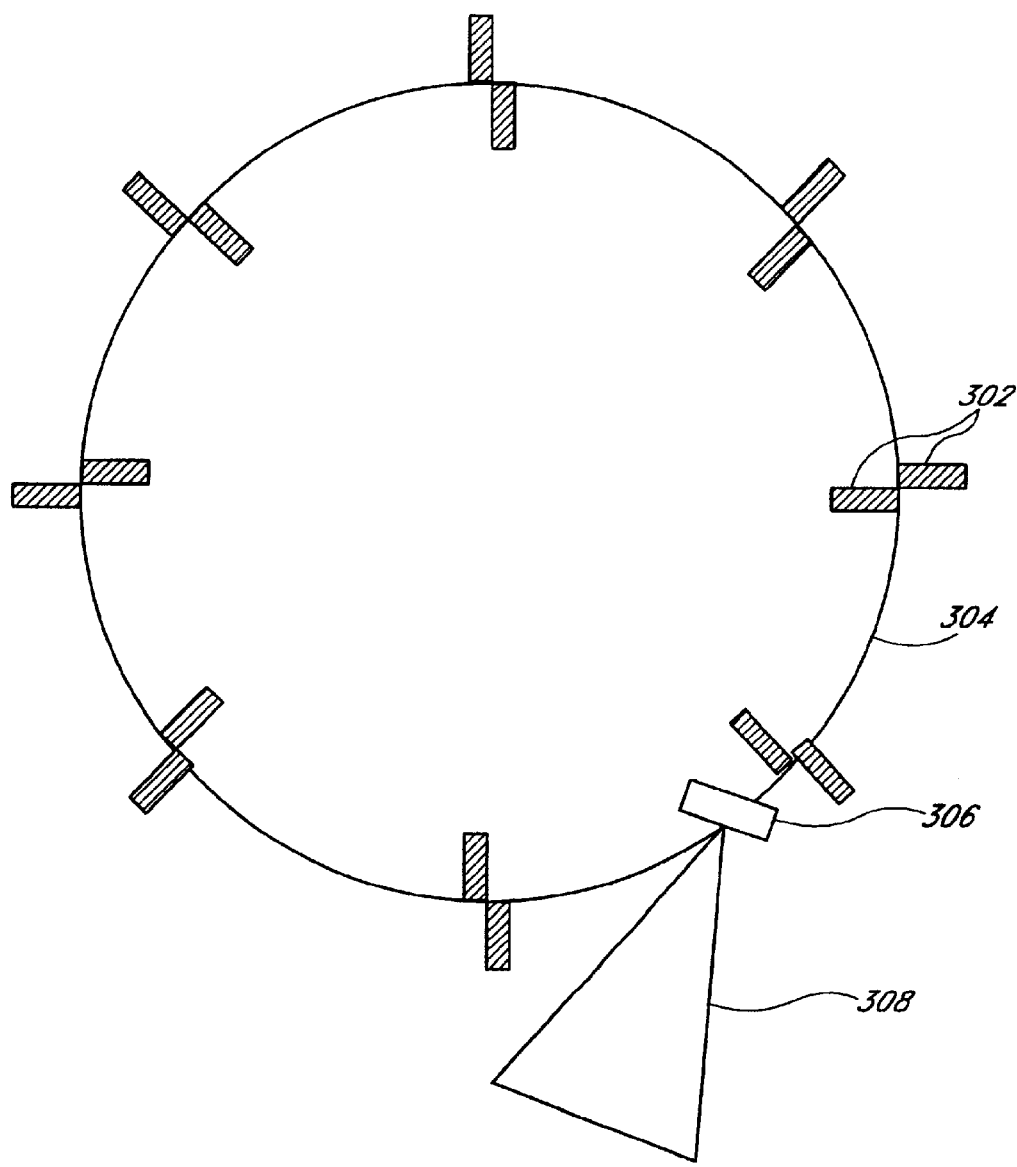
FIG. 1 schematically illustrates the placement of servo tracks on a disk.

FIG. 1 schematically illustrates servo tracks on a disk 410 of a head-disk assembly. A servo burst pair 302 is written on either side of a track 304 on a disk 410. As the disk rotates on a spindle, the read portion of a head 306 mounted on an actuator 308 reads the signals from a servo burst pair 302. The relative amplitudes of the signals from each member of a servo burst pair 302 provides information as to how accurately the head 306 is following the track 304.

Figure 2:
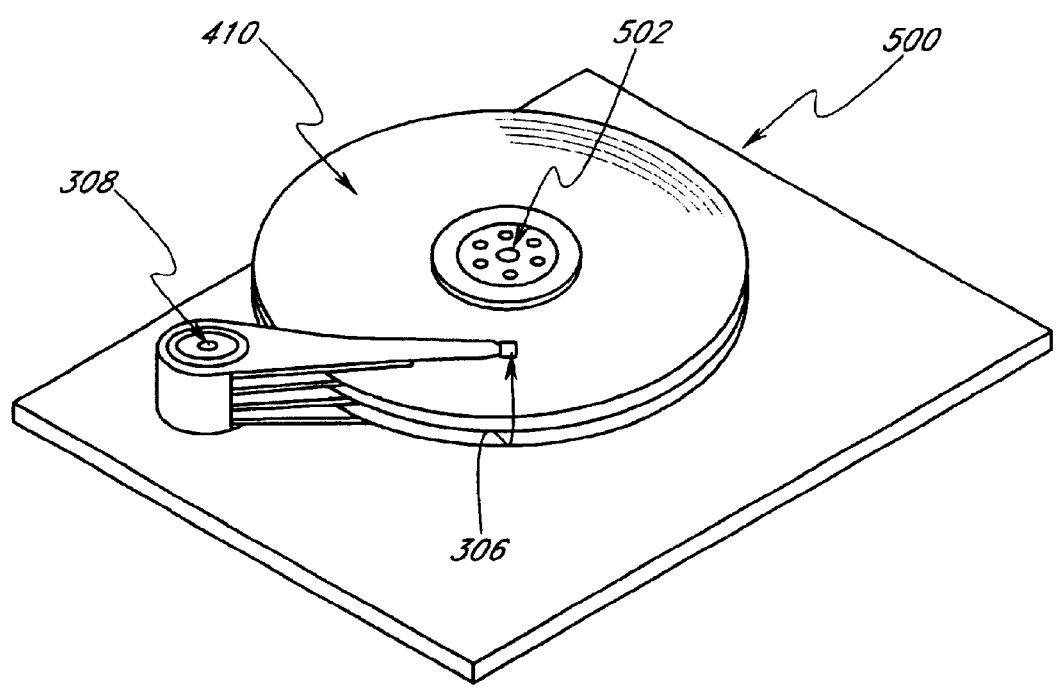
FIG. 2 illustrates a head-disk assembly to which servo tracks are written in an embodiment of the invention.

A hard disk drive comprises a head-disk assembly 500 and a disk drive controller. The head-disk assembly, as illustrated in FIG. 2, comprises one or more disks 410 connected to a spindle 502, a spindle motor 403 (not shown in FIG. 2), a head 306 that can read to, and write from, the disk or disks 410, and a rotary actuator 308 for moving the head 306 relative to the disk 410.

Dynamic variations in the motion of the spindle 502, the behavior of the spindle motor 403, the behavior of the rotary actuator 308, and the movement of the disks 410 result in errors in the position of the head 306 relative to the track 304. A number of these effects are affected by the rotation speed of the spindle 502. Typically, as spindle 502 rotation speed increases, the ability of the head 306 to follow the desired track 304 is degraded. The dynamic variations affect the ability of the head 306 to follow the desired track 304 both when reading and writing to the disk 410 and affect the head 306 positioning when writing the servo tracks to the disk 410. Although writing the servo tracks to the disk 410 at a fast spindle speed may be advantageous insofar as it decreases manufacturing time, it is disadvantageous if the use of a fast spindle speed introduces errors in the position of the servo tracks.

Figure 3B:
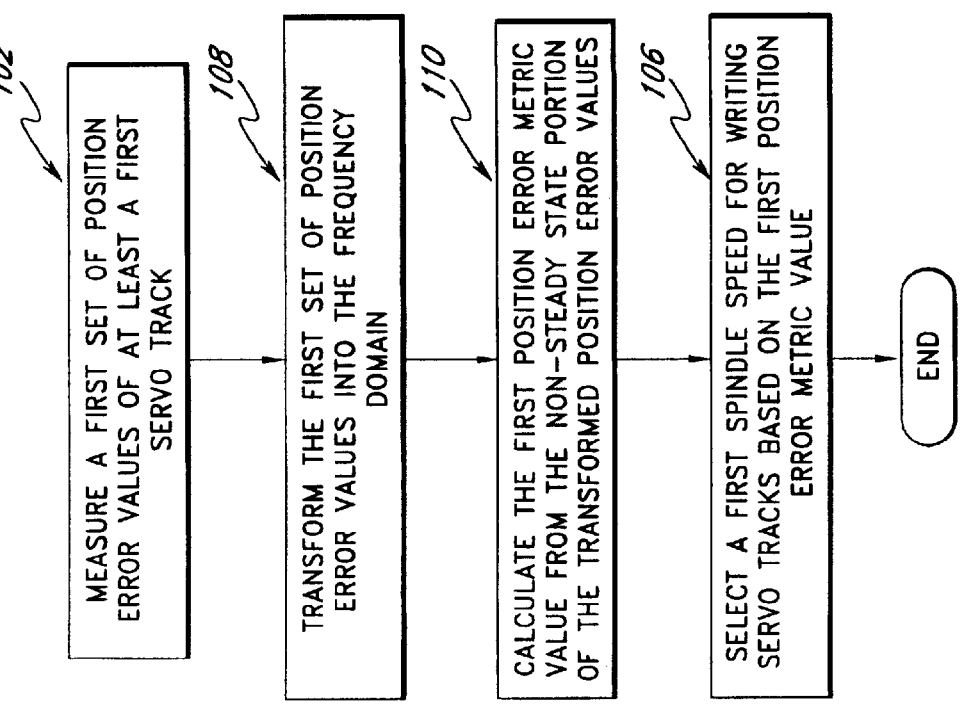
FIG. 3B is a flowchart illustrating an embodiment of a method of selecting a spindle rotation speed for writing servo tracks to a head-disk assembly using position error values transformed into the frequency domain.
Figure 3A:
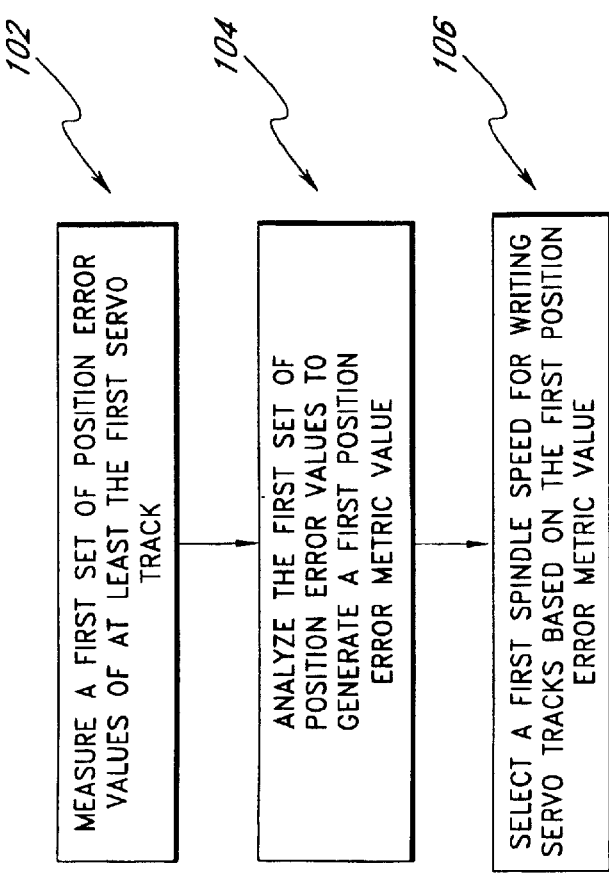
FIG. 3A is a flowchart that illustrates one embodiment of a method of selecting a spindle rotation speed for writing servo tracks to a head-disk assembly.

FIG. 3A is a flowchart of one embodiment of selecting the spindle speed for writing servo tracks to a head-disk assembly 500. A first set of position error values of at least a first servo track on the disk 410 is measured in a step 102. The servo tracks used in the step 102 advantageously comprise one or more tracks written to the disk 410 via a servo track writer, printed or etched on to the disk 410, or written by the disk drive as part of the process of self servo track writing. Self servo writing is described in U.S. Pat. No. 5,949,603, issued Sep. 7, 1999.

In a step 104, the first set of position error values are analyzed to generate a first position error metric. The first position error metric is advantageously a statistical construct calculated from the position error values. In particular embodiments, the position error metric is advantageously the repeatable component of the statistical variance or the deviation of the first set of position error values. In another embodiment, illustrated in FIG. 3B, the position error values are transformed into the frequency domain in a step 108. The position error metric value is calculated from the non-steady state portion of the transformed position error values in a step 110.

A spindle speed for writing servo tracks to the disk 410 based on the first position error metric value is selected in a step 106. The spindle speed is advantageously selected via a look-up table of spindle speeds versus position error metric value. More complex functions to account for other effects (e.g., resonance) on the track follow performance are advantageously used.

In some embodiments, the selected spindle speed is advantageously used to write servo tracks that replace the servo tracks that were previously measured. Alternatively, the servo tracks previously measured are advantageously left on the disk 410 and additional servo tracks are written to the disk 410 in accordance with the selected spindle speed.

Figure 4:
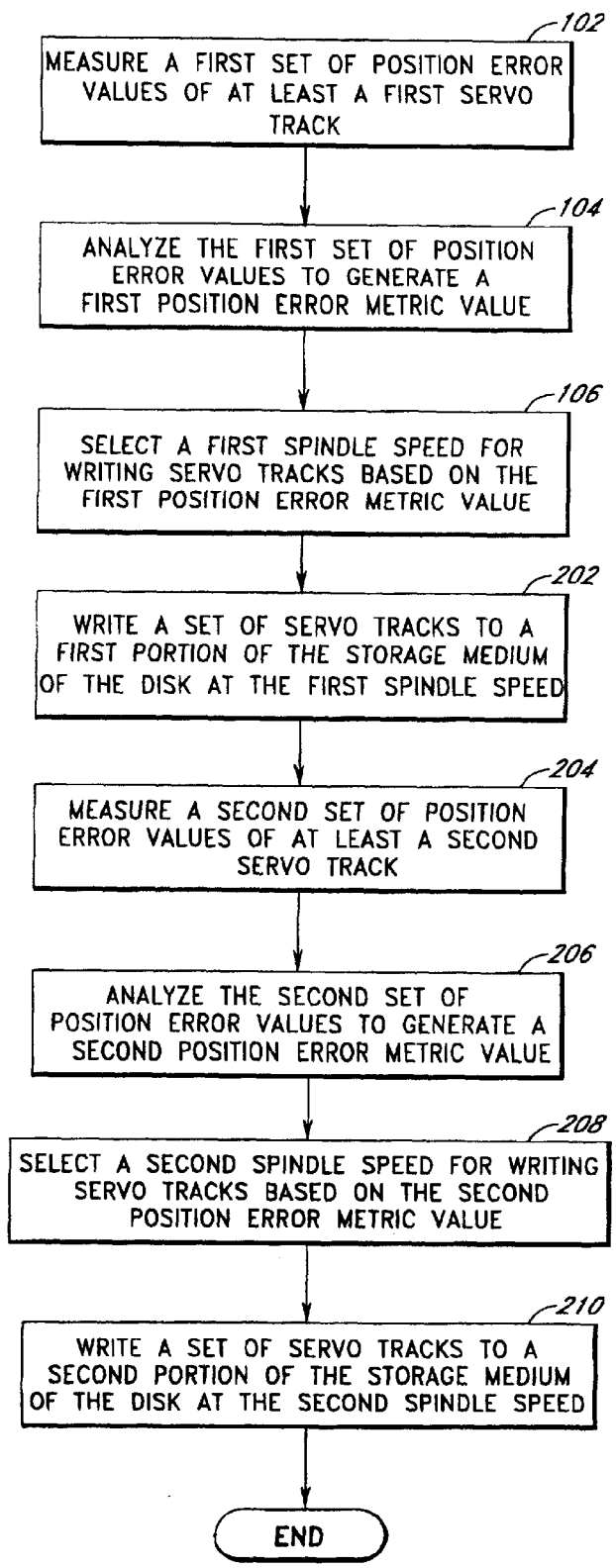
FIG. 4 is a flow chart illustrating an embodiment of a method for selecting a first spindle rotation speed for writing servo tracks to a first portion of a disk and selecting a second spindle rotation rate for writing servo tracks to a second portion of the disk.

The track follow performance of the head-disk assembly 500 is affected by the radial position of the track on the disk 410. Typically, the track follow performance of the head-disk assembly 500 is poorer nearer the outer circumference of the disk 410. FIG. 4 is a flowchart of an embodiment in which different spindle speeds are advantageously selected for writing servo tracks to different portions of a disk 410. A first set of position error values of at least one servo track are measured in a step 102 and analyzed in another step 104 to generate a first position error metric value. A spindle speed for writing servo tracks is selected based on the first position error metric value in a step 106. A first set of servo tracks are written to a first portion of the disk 410 at the selected spindle speed in a step 202.

In a step 204, a second set of position error values for at least a second servo track are measured. The second set of position error values are analyzed to generate a second position error metric value in a step 206, and a spindle speed for writing servo tracks is selected based on the second position error metric in an additional step 208. A second set of servo tracks are written to a second portion of the disk in a step 210 at the selected spindle speed. In alternative embodiments, the disk is advantageously divided into more than two portions, and a spindle speed for writing servo tracks is determined for each portion.

Figure 5:
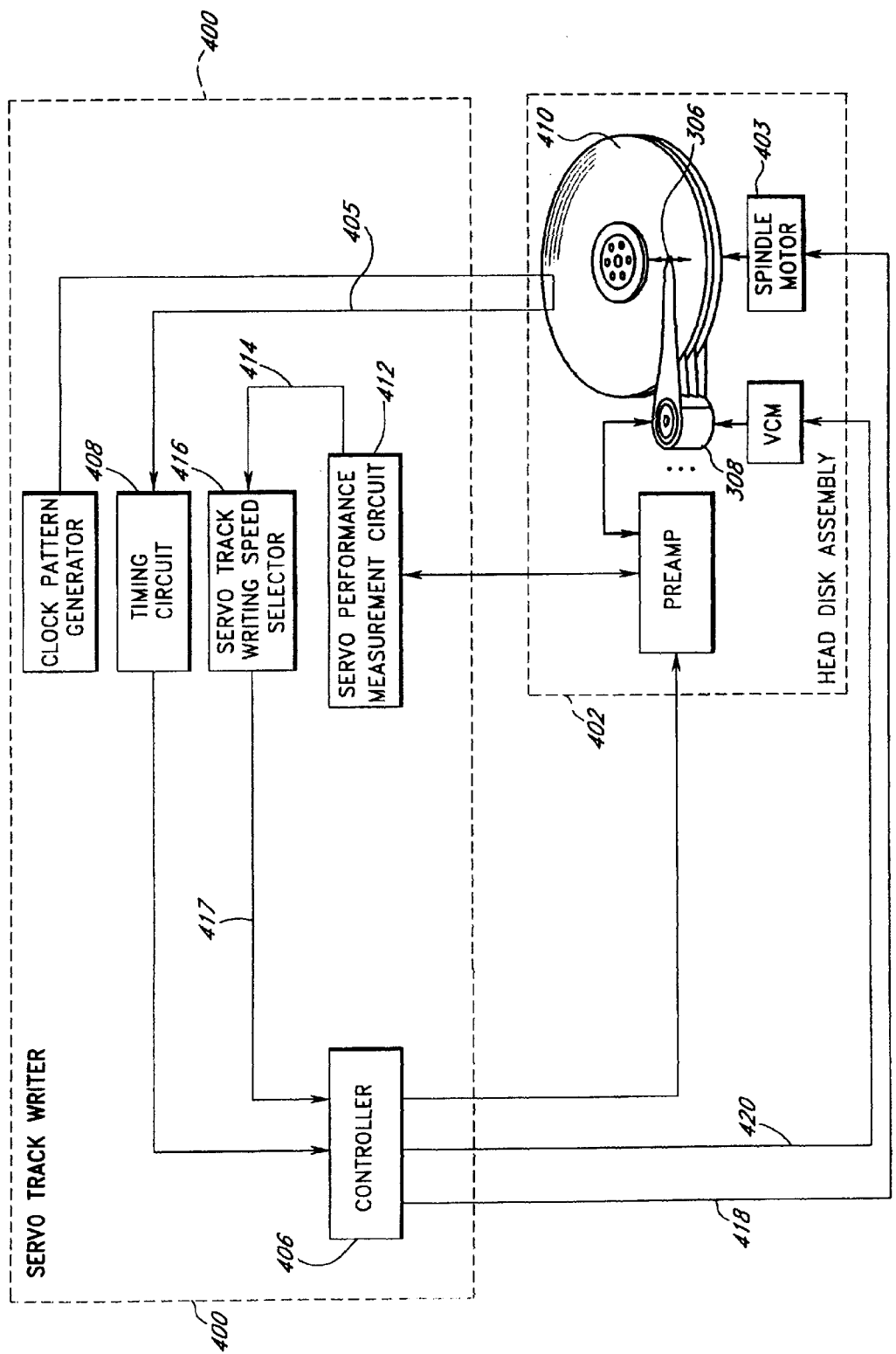
FIG. 5 is a block diagram that illustrates one embodiment of a servo track writer.

In a particular embodiment, illustrated in FIG. 5, a servo track writer 400 writes servo tracks on the disk 410 of a head-disk assembly 500, measures the servo performance of the head-disk assembly 500, and selects a desired spindle rotation speed 417 for writing servo tracks. The servo track writer comprises a controller 406 that processes a clock reference pattern 405 to determine the location of the write head 306 and directs the head 306 to write the servo tracks to the disk 410.

A servo performance measurement circuit 412 within the servo track writer 400 measures the position error values of the servo tracks read via the read head 306 from the disk 410. The servo performance measurement circuit 412 further generates a position error metric value 414 from the position error values of the servo tracks written to the disk 410.

A servo track writing speed selector 416 determines the desired spindle speed 417 for writing the servo tracks to the disk 410. The servo track writing speed selector 416 advantageously comprises a simple parameter lookup or interpolation circuit that outputs the spindle speed for writing servo tracks in some embodiments of the servo track writer 400. In alternative embodiments of the servo track writer 400, the servo track writing speed selector 416 comprises a specially designed microprocessor or ASIC that implements a more complex functional relationship between the position error metric value 414 and the spindle rotation speed 417. In further embodiments of the servo track writer 400, the servo track writing speed selector 416 advantageously comprises a specially programmed general purpose microprocessor or computer used with, or without, custom microprocessors or components.

What is claimed is:

1. A method for determining servo track writing spindle speed for a head disk assembly comprising a recording head, a rotary actuator, a spindle, and a storage medium coupled to the spindle, the storage medium comprising an inner circumference, an outer circumference, and a magnetic-storage portion between the inner circumference and the outer circumference, the method comprising:
   measuring a first set of position error values of at least a first servo track;
   analyzing the first set of position error values to generate a first position error metric value; and
   selecting a first spindle speed for writing servo tracks based on the first position error metric value.

2. The method of claim 1 further comprising writing a set of servo tracks at the first spindle speed to a first portion of the storage medium of the head disk assembly.

3. The method of claim 2 further comprising:
   measuring a second set of position error values of at least a second servo track;

analyzing the second set of position error values to generate a second position error metric value; and selecting a second spindle speed for writing servo tracks based on the second position error metric value.

4. The method of claim 3 wherein generating a second position error metric value comprises determining a repeatable statistical component of the second set of position error values.

5. The method of claim 3 further comprising writing a set of servo tracks at the second spindle speed to a second portion of the storage medium of the head disk assembly.

6. The method of claim 5 wherein the first portion of the storage medium and the second portion of the storage medium are in different physical locations on the storage medium.

7. The method of claim 1 wherein generating a first position error metric value comprises determining a repeatable statistical component of the first set of position error values.

8. The method of claim 7, wherein generating the first position error metric value further comprises:

transforming the first set of position error values into the frequency domain; and calculating the first position error metric value as a function of a non-steady state portion of the transformed position error signal.

9. The method of claim 1 wherein the at least a first servo track is pre-written to the storage medium.

10. The method of claim 1 wherein the at least a first servo track is self-written to the storage medium by the head disk assembly.

11. The method of claim 1 wherein the at least a first servo track is written using a servo track writer.

12. The method of claim 1 wherein the at least a first servo track comprises seed servo tracks pre-written to the storage medium and servo tracks self-written to the storage medium by the head disk assembly.

13. A servo track writing system for writing a plurality of servo tracks on the storage medium of the head-disk assembly, the head-disk assembly comprising a read element, a write element, and an actuator, the servo track writing system comprising:

a controller that processes a clock reference pattern to determine the circumferential location of the write element and that directs the write element to write the servo tracks to the storage medium;

a servo performance measurement circuit that measures position error values of the head-disk assembly and that generates a position error metric value; and a servo track writing speed selector that calculates a desired spindle speed for writing servo tracks based on the position error metric value.

* * * * *